US009207675B1

(12) United States Patent
Walser et al.

(10) Patent No.: US 9,207,675 B1
(45) Date of Patent: Dec. 8, 2015

(54) EVENT SENSOR

(75) Inventors: Michael W. Walser, Comfort, TX (US); Kennon H. Guglielmo, San Antonio, TX (US); Kenneth R. Shouse, Fair Oaks Ranch, TX (US); Joseph Grogan, San Antonio, TX (US)

(73) Assignee: Enovation Controls, LLC, Tulsa, OK (US)

( * ) Notice: Subject to any disclaimer, the term of this patent is extended or adjusted under 35 U.S.C. 154(b) by 540 days.

(21) Appl. No.: 13/193,833

(22) Filed: Jul. 29, 2011

Related U.S. Application Data

(63) Continuation-in-part of application No. 11/056,848, filed on Feb. 11, 2005, now Pat. No. 7,229,330, and a continuation-in-part of application No. 11/811,616, filed on Jun. 11, 2007, now Pat. No. 7,494,393, and a
(Continued)

(51) Int. Cl.
G05D 1/00 (2006.01)
G01C 21/00 (2006.01)
(Continued)

(52) U.S. Cl.
CPC .............. *G05D 1/0206* (2013.01); *G01C 21/00* (2013.01); *G01C 21/16* (2013.01); *G01C 21/20* (2013.01); *Y02T 70/747* (2013.01)

(58) Field of Classification Search
USPC ......... 701/468–469, 461, 532–533, 409–412, 701/408, 400; 340/990, 992, 995.28, 988, 340/995.1; 342/357.34; 367/88; 348/116, 348/139, 142
See application file for complete search history.

(56) References Cited

U.S. PATENT DOCUMENTS 3,748,466 A 7/1973 Sibley
3,921,446 A 11/1975 Ludloff
(Continued)

FOREIGN PATENT DOCUMENTS

JP H1153700 2/1999
WO WO0129512 4/2001

OTHER PUBLICATIONS

TerrLab—a generic simulation and post-processing tool for terrain referenced navigation; Hagen, O.K.; OCEANS 2006 Digital Object Identifier: 10.1109/OCEANS.2006.306834; Publication Year: 2006, pp. 1-7.*
(Continued)

*Primary Examiner* — Cuong H Nguyen
(74) *Attorney, Agent, or Firm* — Haynes and Boone, LLP; William B. Nash; Joseph R. Mencher

(57) ABSTRACT

An automatic timing measurement system that provides a measure of time of passage of a watercraft through a water course. Algorithms based on inertial or other estimates augmented by GPS speed/position measurements and/or image processing techniques on images provided by one or more cameras are used to track position of a watercraft. The position estimates and image processing techniques are used to allow the locations of water courses to be mapped and memorized. Algorithms are then used to allow the system to automatically detect passage of a watercraft through mapped courses for the purpose of measuring and reporting time of passage of said watercraft past key points in said course, and for modifying the behavior of the speed control portion of the apparatus if necessary at certain points in the mapped course. A measure of accuracy of driver steering can be provided along with the ability to automatically steer the watercraft through the course if "steer-by-wire" mechanism is available. GPS speed control is augmented with a secondary velocity measurement device that measures speed over water resulting in an optional user selectable real-time compensation for water current. Furthermore, GPS is used as the key input to produce boat speed-based pull-up profiles.

18 Claims, 10 Drawing Sheets

Related U.S. Application Data continuation-in-part of application No. 11/811,605, filed on Jun. 11, 2007, now Pat. No. 7,491,104, and a continuation-in-part of application No. 11/611,606, filed on Dec. 15, 2006, now abandoned, and a continuation-in-part of application No. 11/811,604, filed on Jun. 11, 2007, now Pat. No. 7,465,203, and a continuation-in-part of application No. 11/811,617, filed on Jun. 11, 2007, now Pat. No. 7,494,394, and a continuation-in-part of application No. 11/903,208, filed on Sep. 19, 2007, now abandoned.

(51) Int. Cl.
  *G05D 1/02* (2006.01)
  *G01C 21/20* (2006.01)
  *G01C 21/16* (2006.01)

(56) References Cited

U.S. PATENT DOCUMENTS

| | | | |
|---|---|---|---|
| 4,392,122 | A | 7/1983 | Hocken |
| 4,422,423 | A | 12/1983 | Sugiyama et al. |
| 4,939,661 | A * | 7/1990 | Barker et al. ............... 701/455 |
| 5,074,810 | A | 12/1991 | Hobbs |
| 5,110,310 | A | 5/1992 | Hobbs |
| 5,142,473 | A | 8/1992 | Davis |
| 5,276,660 | A | 1/1994 | Lee |
| 5,355,855 | A | 10/1994 | Saikalis |
| 5,367,999 | A | 11/1994 | King et al. |
| 5,369,589 | A | 11/1994 | Steiner |
| 5,404,341 | A | 4/1995 | Horiguchi |
| 5,416,712 | A | 5/1995 | Geier et al. |
| 5,458,104 | A | 10/1995 | Tuckey |
| 5,577,474 | A | 11/1996 | Livshiz et al. |
| 5,694,337 | A | 12/1997 | Macken |
| 5,700,171 | A | 12/1997 | Horton |
| 5,731,788 | A | 3/1998 | Reeds |
| 5,808,671 | A | 9/1998 | Maycock et al. |
| 5,828,979 | A | 10/1998 | Polivka |
| 5,828,987 | A | 10/1998 | Tano et al. |
| 5,848,373 | A * | 12/1998 | DeLorme et al. ............ 701/455 |
| 5,884,213 | A | 3/1999 | Carlson |
| 5,904,131 | A | 5/1999 | O'Neill et al. |
| 5,905,713 | A | 5/1999 | Anderson et al. |
| 5,928,040 | A | 7/1999 | Wharton |
| 6,035,252 | A | 3/2000 | Dixon et al. |
| 6,041,762 | A | 3/2000 | Sirosh et al. |
| 6,041,765 | A | 3/2000 | O'Neill et al. |
| 6,076,042 | A | 6/2000 | Tognazzini |
| 6,131,552 | A | 10/2000 | Paielli et al. |
| 6,157,297 | A | 12/2000 | Nakai |
| 6,169,495 | B1 | 1/2001 | Koike |
| 6,176,224 | B1 | 1/2001 | Wu et al. |
| 6,227,918 | B1 | 5/2001 | Wharton |
| 6,259,381 | B1 | 7/2001 | Small |
| 6,267,105 | B1 | 7/2001 | Bertossi |
| 6,273,771 | B1 | 8/2001 | Buckley et al. |
| 6,283,240 | B1 | 9/2001 | Beever |
| 6,289,277 | B1 | 9/2001 | Feyereisen et al. |
| 6,289,278 | B1 * | 9/2001 | Endo et al. .................... 701/431 |
| 6,312,301 | B1 | 11/2001 | Kennedy |
| 6,340,005 | B1 | 1/2002 | Keast et al. |
| 6,353,781 | B1 | 3/2002 | Spivak |
| 6,389,333 | B1 | 5/2002 | Hansman et al. |
| 6,401,446 | B1 | 6/2002 | Gibbons |
| 6,456,910 | B1 | 9/2002 | Roe |
| 6,485,341 | B1 | 11/2002 | Lanyi |
| 6,507,785 | B1 | 1/2003 | Stefan et al. |
| 6,517,396 | B1 | 2/2003 | Into |
| 6,573,486 | B1 | 6/2003 | Ratkovic |
| 6,577,932 | B1 | 6/2003 | Van Beurden |
| 6,701,905 | B1 | 3/2004 | Gaskins |
| 6,722,302 | B2 | 4/2004 | Matsuda et al. |
| 6,748,325 | B1 | 6/2004 | Fujisaki |
| 6,763,226 | B1 * | 7/2004 | McZeal, Jr. .................. 455/90.2 |
| 6,779,752 | B1 | 8/2004 | Ratkovic |
| 6,826,478 | B2 | 11/2004 | Riewe et al. |
| 6,845,321 | B1 | 1/2005 | Kerns |
| 6,855,020 | B2 | 2/2005 | Kaji |
| 6,864,807 | B2 | 3/2005 | Todoriki et al. |
| 6,884,128 | B2 | 4/2005 | Okuyama et al. |
| 6,904,364 | B2 * | 6/2005 | Randazzo et al. ............ 701/409 |
| 6,959,240 | B2 | 10/2005 | Okamoto |
| 6,997,763 | B2 | 2/2006 | Kaji |
| 7,027,808 | B2 * | 4/2006 | Wesby .......................... 455/419 |
| 7,031,224 | B2 | 4/2006 | Reifer |
| 7,047,114 | B1 * | 5/2006 | Rogers ............................ 701/21 |
| 7,143,130 | B2 * | 11/2006 | Lin ................................ 709/203 |
| 7,143,363 | B1 | 11/2006 | Gaynor et al. |
| 7,150,430 | B2 * | 12/2006 | Silansky et al. ................ 244/30 |
| 7,184,888 | B2 * | 2/2007 | Furukawa ..................... 701/410 |
| 7,214,110 | B1 | 5/2007 | Ehlers et al. |
| 7,229,330 | B2 | 6/2007 | Walser et al. |
| 7,236,426 | B2 * | 6/2007 | Turner et al. ..................... 367/88 |
| 7,344,377 | B2 | 3/2008 | Bozicevic |
| 7,354,321 | B2 | 4/2008 | Takada et al. |
| 7,361,067 | B1 | 4/2008 | Smedema |
| 7,398,741 | B2 * | 7/2008 | Koda et al. ............. 114/144 RE |
| 7,415,336 | B1 | 8/2008 | Burch |
| 7,465,203 | B2 | 12/2008 | Walser et al. |
| 7,485,021 | B2 | 2/2009 | Walser et al. |
| 7,491,104 | B2 | 2/2009 | Walser et al. |
| 7,494,393 | B2 | 2/2009 | Walser et al. |
| 7,494,394 | B2 | 2/2009 | Walser et al. |
| 7,841,440 | B2 | 11/2010 | Liu |
| 7,877,174 | B2 | 1/2011 | Walser et al. |
| 7,883,383 | B2 | 2/2011 | Larsson |
| 7,934,983 | B1 | 5/2011 | Eisner |
| 8,006,668 | B1 | 8/2011 | Guglielmo et al. |
| 8,136,506 | B1 | 3/2012 | Guglielmo et al. |
| 8,145,372 | B2 | 3/2012 | Walser et al. |
| 8,176,897 | B1 | 5/2012 | Guglielmo et al. |
| 2001/0032236 | A1 * | 10/2001 | Lin ................................ 709/203 |
| 2001/0055063 | A1 * | 12/2001 | Nagai ..................... G01S 11/12 348/116 |
| 2002/0022927 | A1 | 2/2002 | Lemelson |
| 2003/0036814 | A1 | 2/2003 | Middleton |
| 2003/0050754 | A1 * | 3/2003 | Edwards et al. .............. 701/209 |
| 2003/0060973 | A1 | 3/2003 | Mathews et al. |
| 2003/0135327 | A1 * | 7/2003 | Levine et al. ................. 701/220 |
| 2003/0158665 | A1 * | 8/2003 | McCall et al. ................ 701/220 |
| 2004/0056779 | A1 * | 3/2004 | Rast ........................ B63B 22/16 340/985 |
| 2004/0150557 | A1 | 8/2004 | Ford |
| 2004/0193334 | A1 | 9/2004 | Carlsson et al. |
| 2005/0075782 | A1 * | 4/2005 | Torgunrud .................... 701/117 |
| 2005/0176312 | A1 | 8/2005 | Walser et al. |
| 2005/0191916 | A1 | 9/2005 | Bozicevic |
| 2005/0222933 | A1 * | 10/2005 | Wesby ............................ 705/36 |
| 2006/0038718 | A1 | 2/2006 | Arakane |
| 2006/0074540 | A1 | 4/2006 | Braunberger |
| 2006/0087453 | A1 * | 4/2006 | Iwane ..................... G01C 21/26 340/988 |
| 2006/0089794 | A1 | 4/2006 | DePasqua |
| 2006/0176216 | A1 | 8/2006 | Hipskind |
| 2008/0003899 | A1 | 1/2008 | Walser |
| 2008/0009205 | A1 | 1/2008 | Walser |
| 2008/0009206 | A1 | 1/2008 | Walser |
| 2008/0085642 | A1 | 4/2008 | Guglielmo et al. |
| 2008/0133131 | A1 | 6/2008 | Poreda et al. |
| 2009/0209153 | A1 | 8/2009 | Walser et al. |
| 2010/0087110 | A1 | 4/2010 | Berg |
| 2014/0309930 | A1 * | 10/2014 | Ricci .................. G07C 9/00158 701/431 |
| 2015/0097962 | A1 * | 4/2015 | Rauscher ............... H04N 7/181 348/159 |

OTHER PUBLICATIONS

Modal mapping in shallow water using synthetic aperture horizontal arrays; Frisk, G.V. ; Becker, K.M. ; Doutt, J.A.; OCEANS 2000 MTS/IEEE Conference and Exhibition; vol. 1; Digital Object Iden-

(56) References Cited

OTHER PUBLICATIONS tifier: 10.1109/OCEANS.2000.881258 Publication Year: 2000 , pp. 185-188 vol. 1.*

Matching of ground-based LiDAR and aerial image data for mobile robot localization in densely forested environments; Hussein, M. ; Renner, M. ; Watanabe, M. ; Iagnemma, K.; Intelligent Robots and Systems (IROS), 2013 IEEE/RSJ International Conference on DOI: 10.11C9/IROS.2013.6696537; Publication Year , pp. 1432-1437.*

Modified Hopfield Neural Network Algorithm (MHNNA) for TSS mapping in Penang strait, Malaysia; Kzar, A.A. ; MatJafri, M.Z. ; Lim, H.S. ; Mutter, K.N. ; Syahreza, S.; Signal and Image Processing Applications (ICSIPA), 2013 IEEE International Conference on DOI: 10.1109/ICSIPA.2013.6708001; Publication Year: 2013 , pp. 187-192.*

Aesthetic value characterization of landscapes in coastal zones; Depellegrin, D. ; Blazauskas, N. ; Vigl, L.E; Baltic International Symposium (BALTIC), 2012 IEEE/OES; DOI: 10.1109/BALTIC. 2012.6249166; Publication Year: 2012 , pp. 1-6.*

Queue detection using computer image processing; Hoose, N; Road Traffic Monitoring, 1989., Second International Conference on Publication Year: 1989 , pp. 94-98.*

Locating Subsurface Targets Using Minimal GPR Measurements; Gürbüz, A.C. ; McClellan, J.H. ; Scott, W.R.; Signal Processing and Communications Applications, 2006 IEEE 14$^{th}$; DOI: 10.1109/SIU. 2006.1659746; Publication Year: 2006 , pp. 1-4.*

Multi-UAV-based stereo vision system without GPS for ground obstacle mapping to assist path planning of UGV; Jin Hyo Kim ; Ji-Wook Kwon ; Jiwon Seo; Electronics Letters; vol. 50 , Issue: 20; DOI: 10.1049/el.2014.2227; Publication Year: 2014 , pp. 1431-1432.*

Ship positioning by matching radar images and map data; Aytac, A.E. ; Aksoy, O. ; Akgul, Y.S.; Signal Processing and Communications Applications Conference (SIU), 2014 22$^{22}$; DOI: 10.1109/SIU. 2014.6830506; Publication Year: 2014, pp. 1423-1426.*

Pattern of life for radar port and river security; Silvious, J. ; Tahmoush, D.; Homeland Security (HST), 2012 IEEE Conference on Technologies for; DOI: 10.1109/THS.2012.6459921; Publication Year: 2012 , pp. 626-630.*

Radar-based georeferencing system for estimation of changing rivershores; Posada, J.; Pardo, M.; Velez, J.C.; Alvarado, M. Circuits and Systems (ISCAS), 2014 IEEE International Symposium on; Year: 2014; pp. 2495-2498, DOI: 10.1109/ISCAS.2014.6865679.*

Ship positioning by matching radar images and map data; Aytac, A.E.; Aksoy, O.; Akgul, Y.S.; Signal Processing and Communications Applications Conference (SIU), 2014 22nd; Year: 2014; pp. 1423-1426, DOI: 10.1109/SIU.2014.6830506.*

Phase Altimetry With Dual Polarization GNSS-R Over Sea Ice; Fabra, F.; Cardellach, E.; Rius, A.; Ribo, S.; Oliveras, S.; Nogues-Correig, O.; Rivas, M.B.; Semmling, M.; D'Addio, S.; Geoscience and Remote Sensing, IEEE Transactions on; Year: 2012, vol. 50, Issue: 6; pp. 2112-2121, DOI: 10.1109/TGRS.2011.2172797.*

Position Error Correction for an Autonomous Underwater Vehicle Inertial Navigation System (INS) Using a Particle Filter ; Donovan, G.T.; Oceanic Engineering, IEEE Journal of; Year: 2012, vol. 37, Issue: 3; pp. 431-445, DOI: 10.1109/JOE.2012.2190810.*

Three-dimensional reconstruction of bridge structures above the waterline with an unmanned surface vehicle; Jungwook Han; Jeonghong Park; Jinwhan Kim; Intelligent Robots and Systems (IROS 2014), 2014 IEEE/RSJ International Conference on Year: 2014; pp. 2273-2278, DOI: 10.1109/IROS.2014.6942869.*

Small-scale UAS for geoinformatics applications on an island campus; Starek, M.J.; Davis, T.; Prouty, D.; Berryhill, J.; Ubiquitous Positioning Indoor Navigation and Location Based Service (UPINLBS), 2014; Year: 2014; pp. 120-127, DOI: 10.1109/ UPINLBS.2014.7033718.*

Next-generation coastal mapping to further the National Ocean Enterprise; Sylvester, C.; Oceans, 2012 Year: 2012; pp. 1-8, DOI: 10.1109/OCEANS.2012.6404840.*

Station keeping of an Autonomous Surface Vehicle in surf zone; Chen, E.; Sheng-Wei Huang; Yu-Cheng Lin; Jen-Hwa Guo OCEANS—Bergen, 2013 MTS/IEEE; Year: 2013; pp. 1-6, DOI: 10.1109/OCEANS-Bergen.2013.6608160.*

Race Technology Speedbox 200Hz non-contact speed sensor brochure; Race Technology Ltd., Strelley Hall, Main Street, Nottingham, England NG8 6PE.

Mercury SmartCraft Operation Manual; This Manual Describes the SmartCraft Tachometer/Speedometer Gauge Systems; Copyright Mercury Marine, 90-898283015-907.

http://www.mercurymarine.com/otherproducts/smartcraft/ smartcraftinaction/smarttow.php.

"Cruise and Tow with Consistent Control," Mercury SmartCraft DTS SmartTow brochure, copyright 2006 Mercury Marine.

"Understanding Smart Tow Profiles," Mercury SmartCraft DTS.

"Smart Tow Pro—The Next Wave in Tow Sport Technology," Mercury SmartCraft DTS Smart Tow Pro (GPS Precision) brochure, copyright 2008, Mercury Marine.

"Mercury Marine Launches Smart Tow Pro for DTS SmartCraft engines," Mercury News Release, Dec. 18, 2007.

"Power Trip, Hit It with Mercury's New Smart Two Speed Control," Doc Talk brochure.

* cited by examiner

EVENT SENSOR

CROSS REFERENCE TO RELATED APPLICATIONS

This patent is a continuation-in-part patent application that claims priority and incorporates herein by reference U.S. patent application Ser. No. 11/056,848, now issued as U.S. Pat. No. 7,229,330; U.S. patent application Ser. No. 11/811,616, now issued as U.S. Pat. No. 7,494,393; U.S. patent application Ser. No. 11/811,605, now issued as U.S. Pat. No. 7,491,104; U.S. patent application Ser. No. 11/611,606, now U.S. Pat. No. 7,485,021; U.S. patent application Ser. No. 11/811,604, now U.S. Pat. No. 7,465,203; U.S. patent application Ser. No. 11/811,617, now issued as U.S. Pat. No. 7,494,394; U.S. patent application Ser. No. 11/903,208 filed Sep. 19, 2007.

FIELD OF THE INVENTION

The present disclosure pertains to the field of water sports and boating and more specifically to the sensing of events on a water course.

BACKGROUND OF THE INVENTION

Competitors in trick, jump, and slalom ski and wakeboard events require tow boats capable of consistent and accurate speed control. Successful completion of slalom and jump runs require passes through a competition water course at a precise specific speed. Competition rules usually require that such speed requirements be confirmed by use of a speed measurement system. For example, American Water Ski Association Three-Event Slalom and Jump competitions specify a required time window for completion of all segments of the course to confirm that speed was maintained as required throughout the pass. These times have historically been measured either using manual stopwatch measurements or, more recently, using magnetic sensors which are triggered by the presence of magnets attached to buoys in the water that are in close proximity to the path of the tow boat at the required timing measurement points in the course. Course times are reported and logged for every individual pass in competition. Reliability of triggering the magnetic sensor, as well as maintenance of the magnets attached to the buoys, has consistently caused major difficulties in running competitive 3-event competitions.

SUMMARY OF THE INVENTION

The present disclosure provides a consistent, maintenance free, and accurate system and method of measuring a time of passage of a tow boat and skier through water courses such as those used for slalom and jump competitions without the need for magnets or other physical attachments to the course infrastructure. Global Positioning System (GPS) satellite technology and/or information from a vision tracking system attached to the watercraft may be used to map and memorize the details and location of courses in a permanent memory within a computer system. The system is then able to recognize when the tow boat passes through the course using continuously updated GPS position estimates and/or images taken as the tow boat navigates the course. By interpolating between periodic position updates, the system can accurately estimate time of closest approach to the entry gate to the course. The system may then subsequently determine time between points of interest in the course using the same GPS position measurement technique, by tracking displacement of the tow boat down the line of the course using other techniques such as integration of velocity to derive position displacement, through the use of the vision tracking system, and combinations thereof.

The present disclosure also provides an automatic timing measurement system and method that provides a measure of time of passage of a watercraft through a prescribed course. Algorithms based on inertial or other estimates augmented by GPS speed/position measurements and/or the vision tracking system are used to track the position of the watercraft relative to the course. The position estimates are used to allow the details and locations of prescribed courses to be mapped and memorized. Algorithms are then used to allow the system to automatically detect passage of a watercraft through mapped courses for the purpose of measuring and reporting time of passage of said watercraft past key points in said course, and for modifying the behavior of the speed control portion of the watercraft if necessary at certain points in the mapped course. A measure of accuracy of driver steering can be provided along with the ability to automatically steer the watercraft through the course if "steer-by-wire" mechanism is available. GPS and/or vision tracking speed control is augmented with a secondary velocity measurement device that measures speed over water resulting in an optional user selectable real-time compensation for water current. Furthermore, GPS is used as the key input to produce boat speed-based pull-up profiles.

BRIEF DESCRIPTION OF THE DRAWINGS

FIG. 1b is a front view of an embodiment of an external housing of an event detector used in the watercraft of FIG. 1a.

DETAILED DESCRIPTION OF THE PREFERRED EMBODIMENT

The present invention relates generally to electronic event detectors and more specifically to electronic event detectors for use with watercrafts such as, for example, power boats.

Figure 1A:
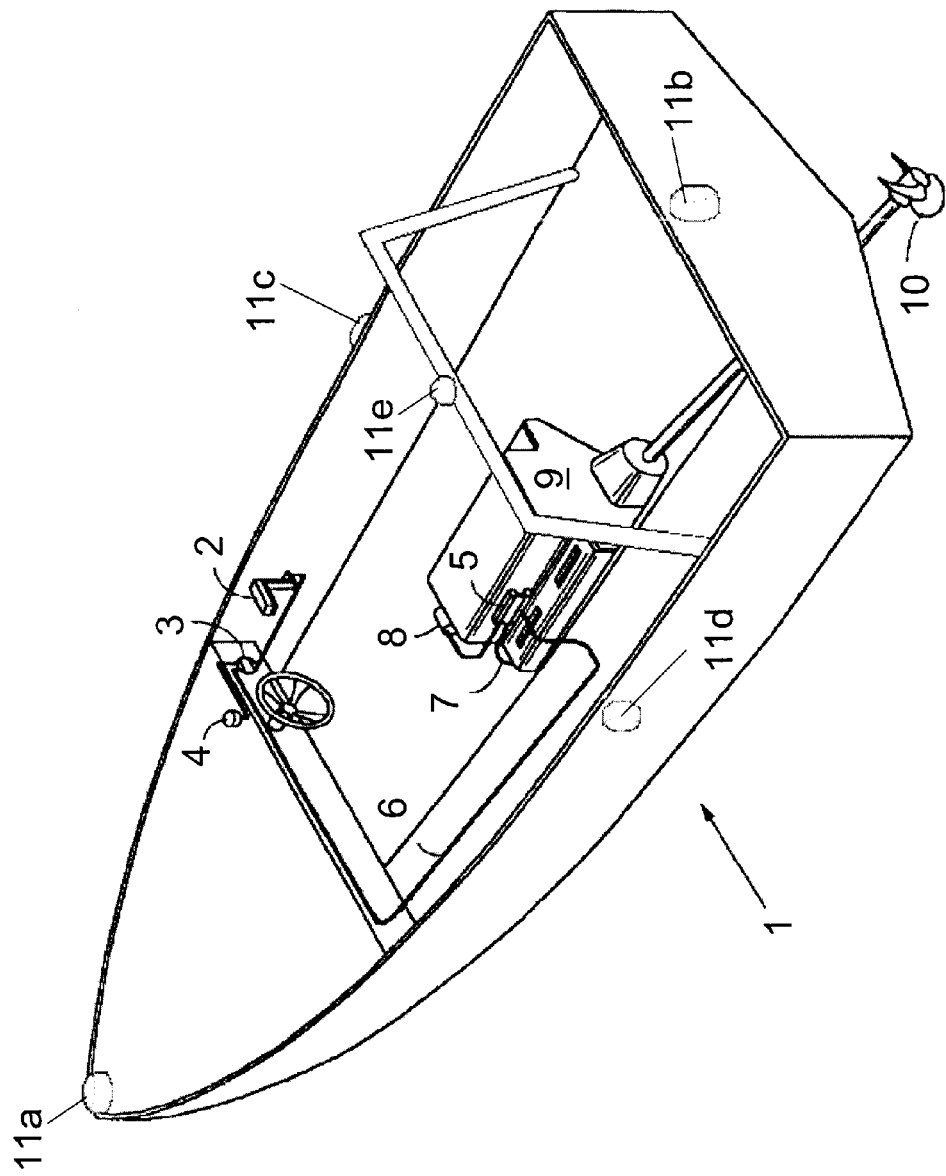
FIG. 1a is a perspective view of an embodiment of a watercraft.

Referring now to FIG. 1, a watercraft 1 is illustrated. The watercraft 1 includes a manual throttle control 2 that is coupled to a control keypad and display 3. The display is coupled to a Global Positioning System (GPS) device 4 and a control module 5 through a communications link 6. The control module 5 is coupled to a communications link 7 and a engine throttle 8 on an engine 9. The engine 9 is coupled to a propeller 10. One or more cameras 11a, 11b, 11c, 11d, and/or 11e are mounted to the watercraft 1. In the illustrated embodiment, the camera 11a is mounted to a front portion of the watercraft 1, the camera 11b is mounted to a rear portion of the watercraft 1, the cameras 11c and 11d are mounted to opposing side portions of the watercraft 1, and the camera 11e is mounted above the watercraft 1 (e.g., on a tow bar in the illustrated embodiment.) In an embodiment, each of the cameras 11a, 11b, 11c, 11d, and/or 11e may include one or more cameras, and one or more of the 11a, 11b, 11c, 11d, and/or 11e may be omitted from the watercraft 1 without departing from the scope of the present disclosure. In operation, an operator of the watercraft 1 controls the speed of the engine 9 and propeller 10. As discussed in further detail below, the operator may supply predetermined and desired velocity through the control keypad and display 3 to the control module 5 that houses algorithms of an event sensor system. GPS measurements from the GPS device 4 and predetermined velocity values and information from the cameras may be sent to the control module 5 via the communications link 6. The communications link 7 feeds engine speed measurements from a tachometer to the control module 5. The system may be overridden at any time through operator control of the manual throttle control 2 that controls the engine throttle 8.

Figure 1B:
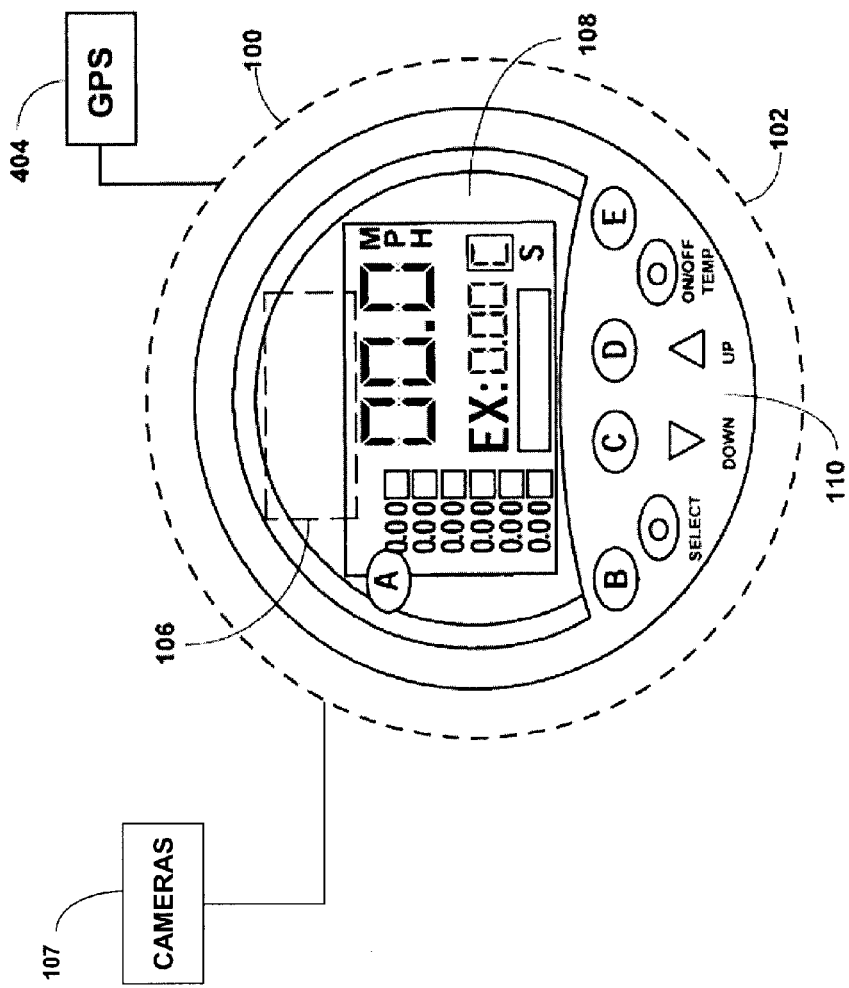

Referring now to FIG. 1b, the event detector 100 of the present invention includes a housing 102 for housing the electronics of the event detector and coupling to an accelerometer 106, a GPS 104, and one or more cameras 107 (e.g., one or more of the cameras 11a, 11b, 11c, 11d, and/or 11e discussed above with reference to FIG. 1a.) GPS 104 is preferably a unit separate from housing 102, e.g. a GARMIN® GPS 18-5 Hz.

Electronic housing 102 includes a display 108 and interface buttons 110 (e.g., the control keypad and display 3 discussed above with reference to FIG. 1a.) As will be appreciated by one skilled in the art, the display 108 is preferably made out of moldable materials such as plastic, aluminum, glass, and the like, with a clear glass or plastic cover. Importantly, the housing 102 is adapted to be waterproof to prevent damage to the electronics when in use. The display 108 may be a commercially available LCD display that is capable of displaying numbers or letters and information related to an event. User interface buttons 110 are actuators attached to the electronics covered in a rubberized membrane that allows buttons to remain waterproof during their actuation. The LCD display interface buttons 110 and glass cover are attached to an insulated housing 102 via e.g., screws, friction fit, adhesive, or the like inside the housing 102 are electronics, to be described below, that perform the functions of the device.

Figure 2:
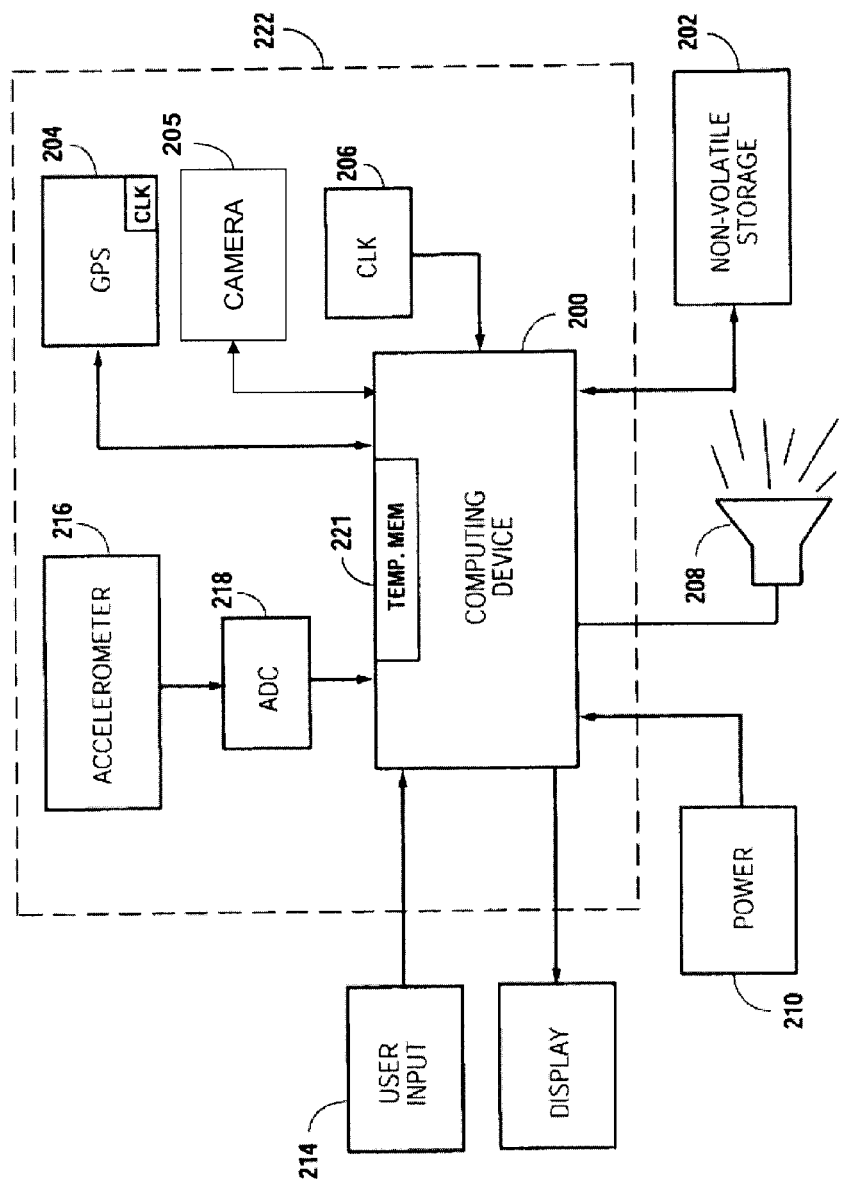
FIG. 2 is a block diagram of the electronics contained within the event detector of FIG. 1b.

The electronics will now be described with reference to FIG. 2. In general, the electronics of the event locator device 100 includes microprocessor 200, non-volatile storage 202, GPS interface 204, a camera interface 205, Clock 206, speaker 208, power device 210, user input interface 214, accelerometer 216, and analog-to-digital converter 218.

Microprocessor 200 is the "brains" of the invention and performs location calculations and timing data for output to a user. Preferably microprocessor 200 is capable of being externally programmed. Storage 202 is connected to microprocessor 200 and may store event data such as map information, location information, and timing information for the microprocessor's calculations. Storage 202 may also include a non-transitory, computer readable medium that stores instructions that, when executed by the microprocessor 200, cause the microprocessor to perform one or more of the methods discussed below. Clock device 206 provides time data to the microprocessor 200 which can be displayed to a user. GPS interface 204 may be coupled to the GPS device 4/GPS 104 and interfaces with the GPS system which provides location data to the microprocessor 200. Camera interface 205 is coupled to the cameras 11a, 11b, 11c, 11d, 11e, and/or 107, and allows the microprocessor 200 to receive information (e.g., images) sent from the cameras 11a, 11b, 11c, 11d, 11e, and/or 107 to implement a vision tracking system, discussed in further detail below. Accelerometer 216 generates an acceleration signal and provides the same to the microprocessor 200. Analog-to-digital (ADC) converter 218 converts the signal from the accelerometer 216 to a digital signal for input into the microcontroller 200. User input interface 214 is connected to the microprocessor 200 and allows the user to program certain device settings into the non-volatile storage 202 such as map information, desired speed, and the like. Display 212 interacts with microprocessor 200 to display event data speed, location and time information. Power supply 210 provides power to microcontroller and all of the associated electronics.

The general operation of microprocessor 200 will now be described in more detail with reference to FIG. 3. In an embodiment, FIG. 3 contemplates a scenario where course mapping information is already saved in memory and accessible by the microprocessor. As is shown, the accelerometer receives a signal from the boat indicative of the boat's acceleration and inputs this signal to a microprocessor. The microprocessor converts the acceleration value into a velocity value in step 15 and in step 16 receives both the velocity information from the accelerometer and the velocity data from the GPS. As one skilled in the art will appreciate the velocity from a GPS is not updated continuously, and the velocity information from the accelerometer is used to provide resolution to the velocity information from the GPS system in step 17. An observed velocity is output at step 17, and in step 70 the velocity information and direction information obtained from the GPS system is used to calculate a latitude and longitude value for the accelerometer. In step 80, latitude and longitude information from the GPS system is compared to latitude and longitude information from the accelerometer. Much like step 17, the latitude and longitude information from the accelerometer is then used to augment the GPS signal. The microprocessor then outputs a latitude and longitude observed signal, which is used in reference to map data input by the user at the start of the process. When a preselected event occurs, as calculated by the comparison observed latitude/longitude signals the microprocessor outputs a sound signal to speaker 208 and a display signal to user display 108. Furthermore, information provided from the vision tracking system on the watercraft (e.g., images from cameras 11a, 11b, 11c, 11d, 11e, and/or 107) may be used to confirm the occurrence of the preselected event or the position of the watercraft on a water course (e.g., relative to known features or points of interest on the water course.)

Collectively, the accelerometer 216, analog-to-digital converter 218, computing device 200, GPS unit 204, cameras, memory 221 and clock 206 comprise the elements of an observer 222. The observer 222 is adapted to act both as a velocity observer (in which it outputs an observed velocity) and as a position observer (in which it outputs an observed position). In the preferred embodiment of the present invention, an accelerometer acts as the primary source of data for computing displacements over time, with periodic updates from the GPS provided to account for drift in the accelerometer. Furthermore, information provided from the vision tracking system on the watercraft (e.g., images from cameras 11a, 11b, 11c, 11d, and/or 107) may be used to confirm the position of the watercraft on a water course (e.g., relative to known features or points of interest on the water course.) But it will be appreciated by those skilled in the art that there are many other methods available for performing this task. For example, over-water velocity may be measured directly by means of a transducer such as a paddle wheel or a pitot tube, and those measurements may or may not be corrected with GPS inputs. In the case of direct velocity measurement, only a single integration with respect to time is needed to compute a new position. And, as GPS technology becomes more accurate and as new data are available at a higher frequency, it is conceivable that a GPS unit will provide the sole velocity and position inputs. Other configurations for measuring velocity and position will be apparent to those of ordinary skill in the art, and it is intended for this patent to encompass such additional configurations.

The specific software flow of the microprocessor programming will be described with reference to FIGS. 5 through 8.

Figure 5:
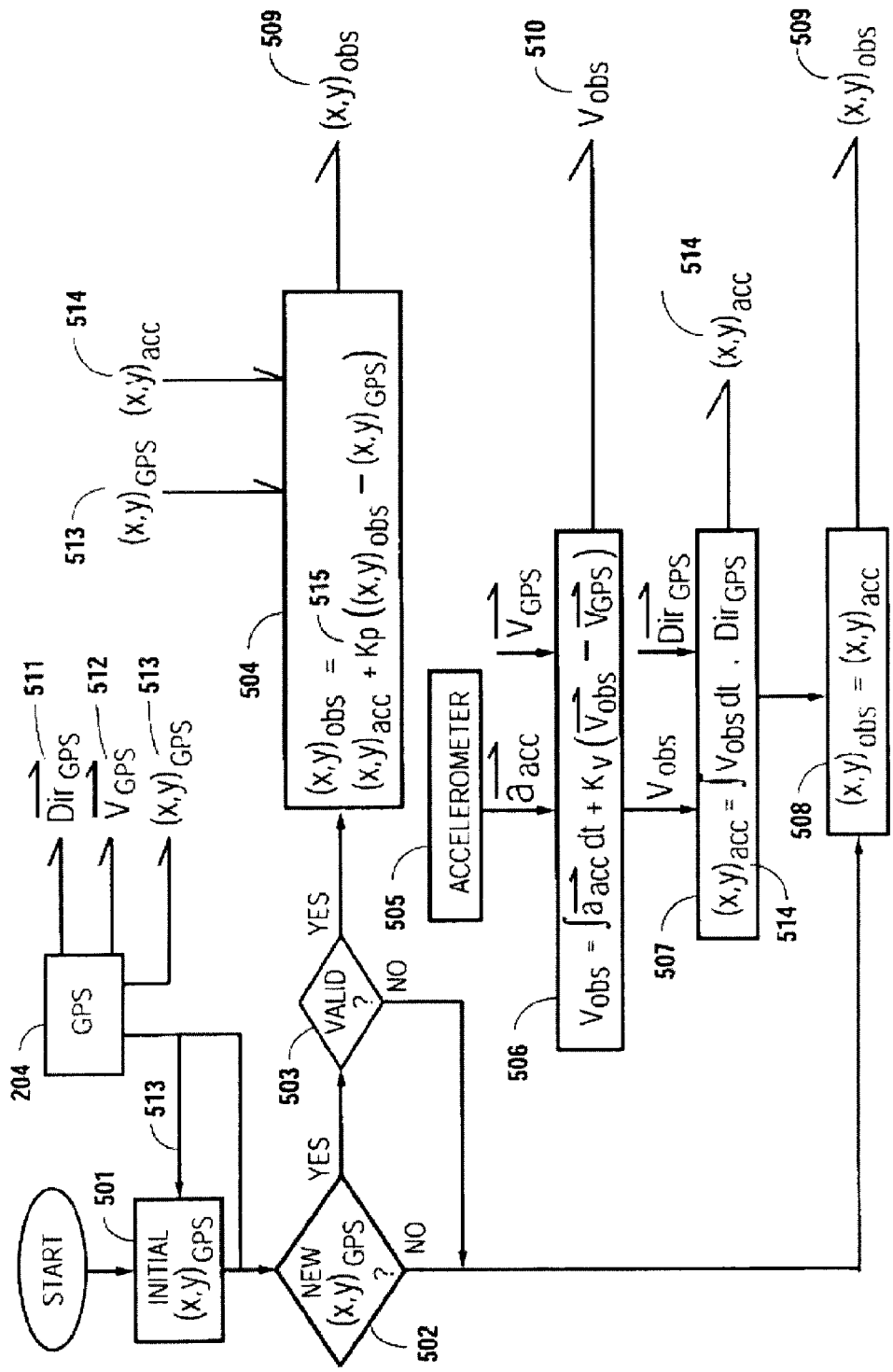
FIG. 5 is a flow diagram disclosing a method that an observer may use to determine observed velocity and observed position.

FIG. 5 discloses the functioning of a preferred embodiment of an observer 222. In step 501, a GPS signal is received from the GPS device 204. GPS device 204 provides a GPS position 513, a GPS velocity 512, and a GPS direction 511. Step 501 uses the GPS position as its initial starting position. In Step 502, there is a check to see if a new GPS position has been received. If a new GPS position has been received, in Step 503 it is checked to see if the GPS position is a valid GPS position. Step 503 compensates for the potential of invalid GPS signals such as occasionally occur in GPS devices known in the art. If the new GPS signal is a valid signal, then the observed position 509 is set to a value of the accelerometer corrected by the difference between the last observed position and the GPS position 513. A constant 515 is provided such as is calculated to provide the appropriate weight to the GPS measurement. For example, if constant 515 is set to one, then the GPS position is afforded its full weight. If constant 515 is set to a value less than one, the GPS is provided less weight, and it if it set to a value greater than one, the GPS is provided more weight. This constant is selected in accordance with the relative accuracies of the GPS and accelerometer such that for a more accurate GPS device, greater weight can be given to the GPS value and for a less accurate GPS device, less weight can be given to the GPS value. The result of this calculation is an observed position 509.

It is necessary to compensate for the 5 Hz resolution of the GPS device. This resolution is insufficient for the preferred embodiment of the present invention. So there is provided an alternative device, starting at step 505, which includes an accelerometer 316. The accelerometer provides a measured acceleration which is converted to a binary value in analog-to-digital converter 218. It is then useful for being compared to digital values provided by the GPS device 204. In step 506, an observed velocity is computed. The velocity is computed by first taking the last observed velocity 510 and the velocity provided by the GPS 512. This difference is adjusted by a velocity constant 517. As with position constant 515, velocity constant 517 is selected to compensate for the relative accuracy of the GPS device. The weighted difference is then added to the velocity computed by taking the first integral of the acceleration with respect to time, thereby providing a correction factor. In step 507, an accelerometer-computed position 514 is calculated. This position is computed by taking the integral of the velocity vector with respect to time. The displacement calculated thereby is adjusted to the direction signal provided by the GPS. This GPS correction step is used in the preferred embodiment because, in the interest of simplicity, the three-accelerometer is used only to compute acceleration along the single axis of the length of the boat. The result is accelerometer-computed position 514. The usefulness of accelerometer-computed position 514 is that it can be calculated at a frequency of approximately 1,000 hertz. So returning to step 502, if no new GPS signal has been provided, then the observed position is provided by the change in position as calculated by the accelerometer with no further input from the GPS device. Thus, there is provided from the observer an observed position 509 as well as an observed velocity 510. Furthermore, information provided from the vision tracking system on the watercraft (e.g., images from cameras 11a, 11b, 11c, 11d, 11e, and/or 107) may be used to confirm the position of the watercraft on a water course (e.g., relative to known features or points of interest on the water course.)

Figure 8:
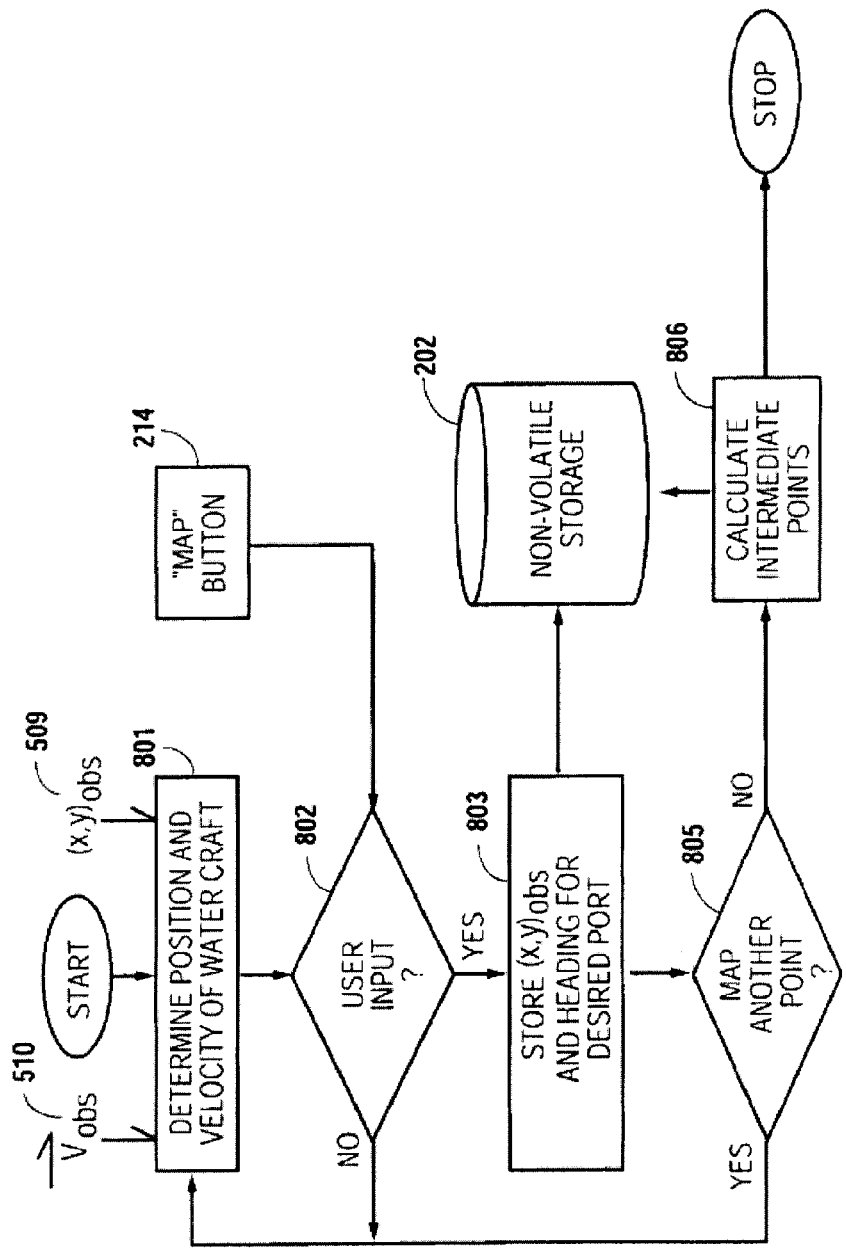
FIG. 8 is a flow diagram disclosing a method by which a user interactively "maps" a desired water course, and by which the system stores the mapped water course into non-volatile memory.

FIG. 8 discloses a method of using a watercraft equipped with a position and velocity observer, such as is described in FIG. 5, to map a competitive water course. In step 801, there is initial determination of the position and velocity of the watercraft as provided by the observed velocity 510 and the observed position 509. In step 802, there is a check to see whether there has been a user input from a map button 214. If no user input is provided, then the position observer continuously updates the position and velocity of the watercraft. Once there has been a user input at step 803, the current observed position 509 and the current heading are stored in non-volatile storage 202. In step 805, there is provided a step of checking to see if it is desired to map another point. If another point is to be mapped, then there is a return to step 801 and the method is repeated until, at step 805, there is no further point to mapped. When there is no further point to be mapped, at step 806, the device may calculate a number of predetermined intermediate points in between the points mapped and stored in step 803. These intermediate points are also stored in non-volatile storage 202. In an embodiment, information provided from the vision tracking system on the watercraft (e.g., images from cameras 11a, 11b, 11c, 11d, 11e, and/or 107) may be used to map the water course. For example, as the system is used to map the competitive water course, as discussed above, at step 803, images from the camera(s) may be received by the microprocessor. The memory may include instructions that, when executed by the microprocessor, cause the microprocessor to detect features and/or points of interest on the water course from images sent from the cameras such as, for example, entry gates, exit gates, boat buoys, ski buoys, break points, intermediate points, and a variety of other water course features known in the art, and store those features in the non-volatile storage 202. Those detected features and/or points of interest may be associated with observed positions of the watercraft to map the water course and/or supplement the mapping of the water course using the observed velocity 510 and observed position 509 as described above above.

Figure 6:
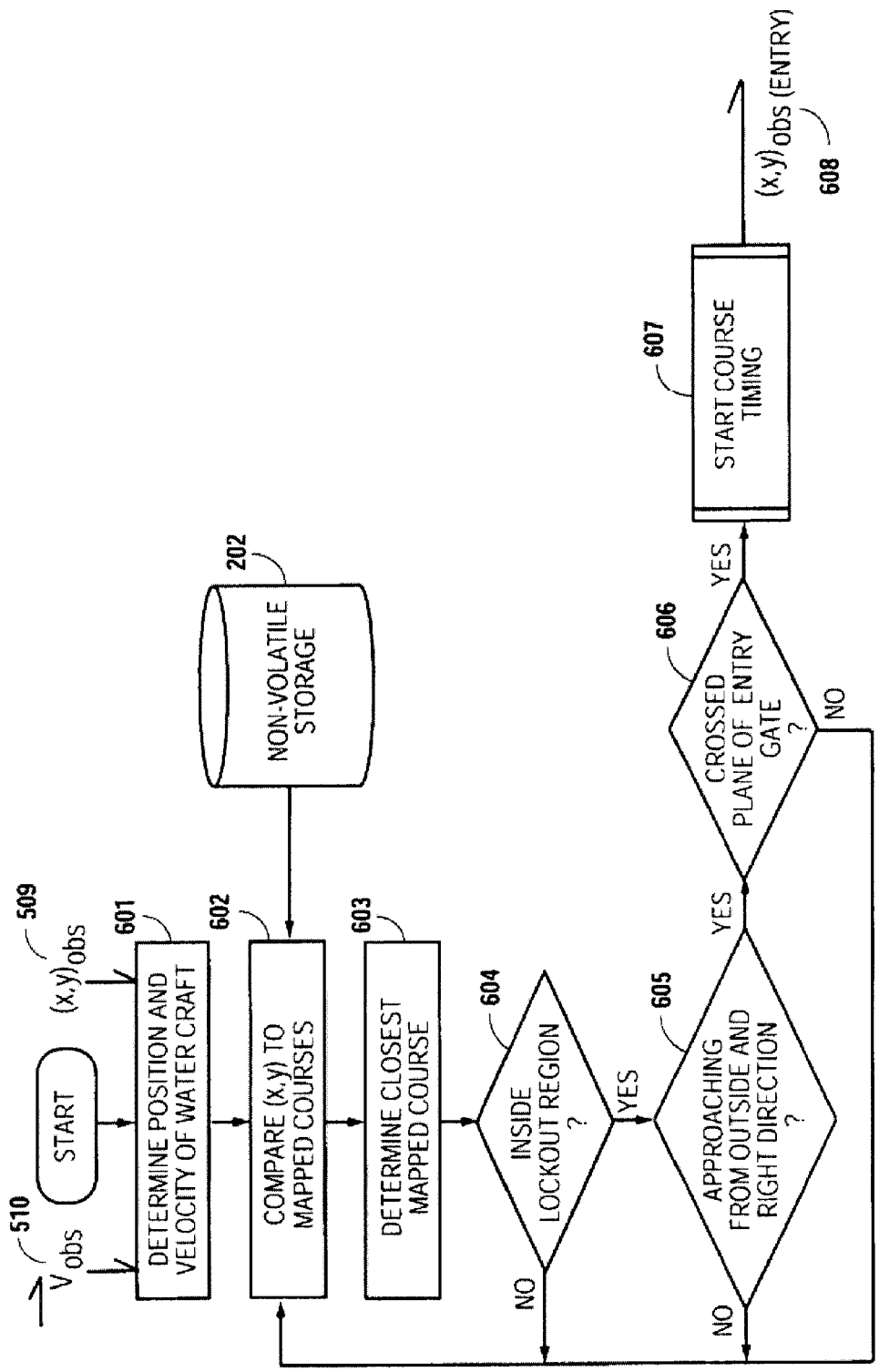
FIG. 6 is a flow diagram disclosing a method for automatically detecting a previously-mapped course.

In FIG. 6, there is disclosed a method of automatically detecting a course that has been mapped in accordance with the method of FIG. 8. At step 601, there is initial determination of position and velocity provided by observed position 509 and observed velocity 510. In step 602, compare the observed position 509 to a predetermined position as mapped in accordance with the method of FIG. 8. This mapped position is provided from non-volatile storage 202. In 603 there is a determination of which of a plurality of mapped courses as mapped in accordance with the method of FIG. 8 is the closest to the present observed position 509. Once a closest course has been locked in, then, in step 604, there is a check to see whether the watercraft is inside the lockout region of the closest water course. If the craft is within the lockout region, then there is also a check to see whether the craft is approaching from outside the course and is proceeding in the right direction along the center line of the course. If these criteria are not met, then continue looking for entrance into a course. If the criteria are met, then, in step 606, check to see whether the craft has crossed the plane of the entry gate of the course. If it has not, then return to step 602, continuing looking for entry to a course. If the criteria are met, then the craft has entered a mapped course and the course timing algorithm will automatically begin in step 607. This provides an observed position at the entry point 608. In an embodiment, information provided from the vision tracking system on the watercraft (e.g., images from cameras 11a, 11b, 11c, 11d, 11e, and/or 107) may be used to automatically detect a water course that has been mapped in accordance with the method of FIG. 8. For example, as the system is used to detect the water course, as discussed above, images from the camera(s) may be received by the microprocessor. The memory may include instructions that, when executed by the microprocessor, cause the microprocessor to detect features and/or points of interest on the water course from images sent from the cameras such as, for example, entry gates, exit gates, boat buoys, ski buoys, break points, intermediate points, and a variety of other water course features known in the art. Those detected features and/or points of interest (e.g., an entry gate) may be compared with mapped water course information saved in the storage to determine which of a plurality of water courses is the closest to the watercraft. Once a closest course has been determined, then, in step 604, the relative position of detected features and/or points of interest (e.g., an entry gate) and the watercraft may be used to determine whether the watercraft is inside the lockout region of the water course.

Figure 7:
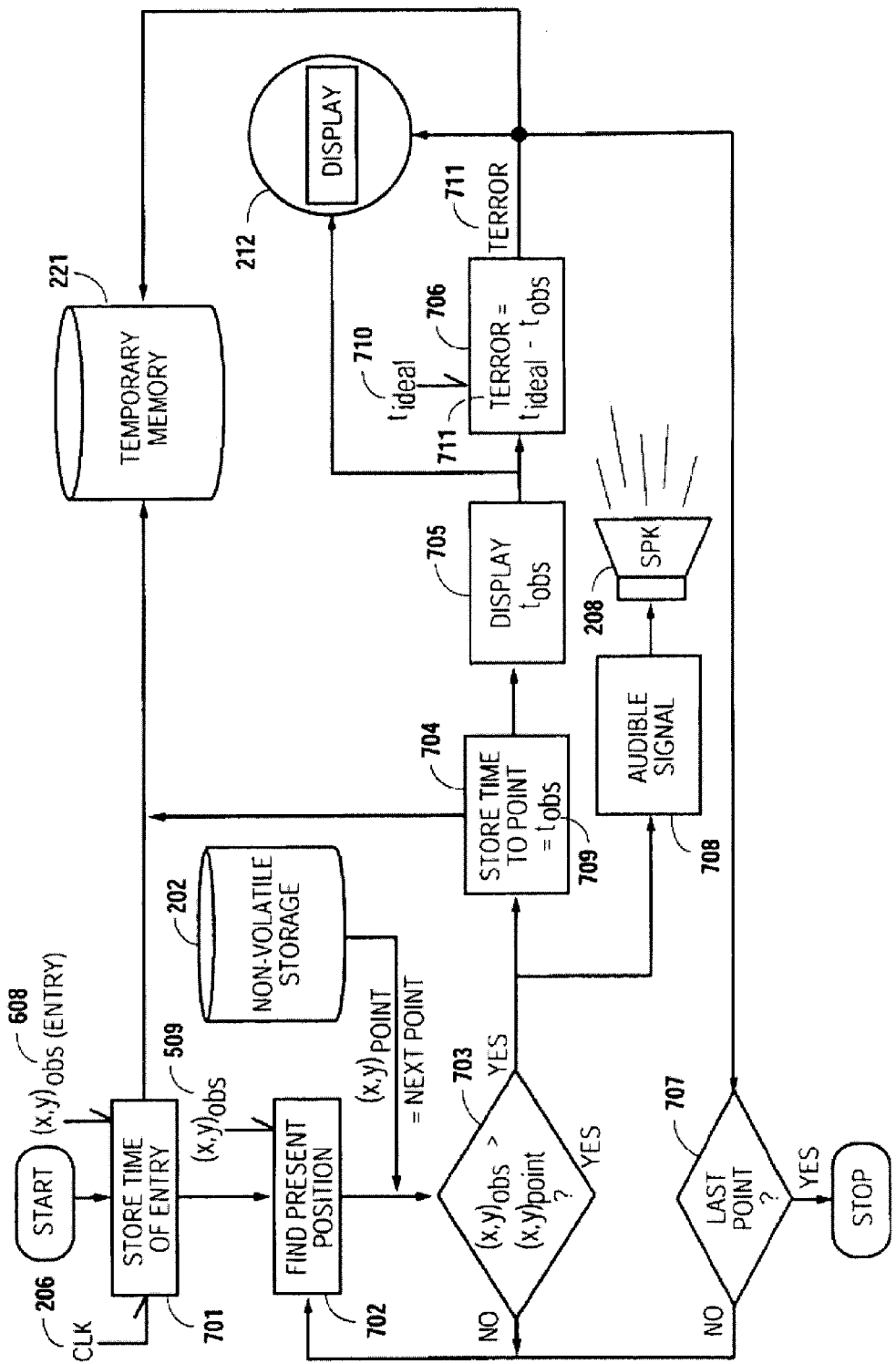
FIG. 7 is a flow diagram disclosing a method of detecting and reporting the time at which a plurality of events is detected.

In FIG. 7 there is disclosed a method for computing total time and intermediate times through a competitive water course. There is provided an observed position at the entry point 608 and there is also provided a clock signal 206. In step 701, the time at the entry point is recorded in temporary memory 221. In step 702, an observed position 509 is provided and this provides the present position of the watercraft. A plurality of points of interest are stored in non-volatile storage 202. In step 703, a point of interest is provided and there is a check to see if the current observed position 509 exceeds the position of the point of interest. If the present position 509 does not exceed the position of the point of interest, then the loop is continued until the present observed position exceeds the position of the point of interest. At this point, in step 704, the present observed time 709 is recorded into temporary memory 221 and, in step 705, the current observed time 709 is displayed on user display 212. In step 706, there is provided an ideal time 710. An error time 711 is computed as the difference between the ideal time 710 and the observed time 709. The error time 711 is also stored in temporary storage 221 and displayed on user display 212. In an embodiment, information provided from the vision tracking system on the watercraft (e.g., images from cameras 11a, 11b, 11c, 11d, 11e, and/or 107) may be used to compute total time and intermediate times through a water course. For example, as the system is used to compute total time and intermediate times through the water course, as discussed above, information from the camera(s) may be received by the microprocessor. The memory may include instructions that, when executed by the microprocessor, cause the microprocessor to detect features and/or points of interest on the water course from images sent from the cameras such as, for example, entry gates, exit gates, boat buoys, ski buoys, break points, intermediate points, and a variety of other water course features known in the art. The detection of an entry gate feature at a predetermined position relative to the watercraft by the microprocessor from an image from the camera(s) at step 701 may cause the time at the entry gate to be recorded in temporary memory 221. Furthermore, at step 703, images from the camera(s) may be processed by the microprocessor to determine when the water craft has passed the position of any features or points of interest on the water course and, if so, record the time into temporary memory 221. The error time 711 may then be computed and stored in temporary storage 221 and displayed on user display 212 as discussed above.

In a parallel process to step 704, when a feature or point of interest on the water course is reached and/or detected, there is also provided an audible signal through a speaker 208 to provide an audible indication to the user that this point has been passed. After steps 704, 705, 706 and 708 are completed, then in step 707 there is a check to see if this is the last point of interest. If it is not, then there is a return to step 702. If this is the last point of interest, the process ends.

The use of the device will now be described with respect to FIGS. 3, 4 and 9.

Figure 3:
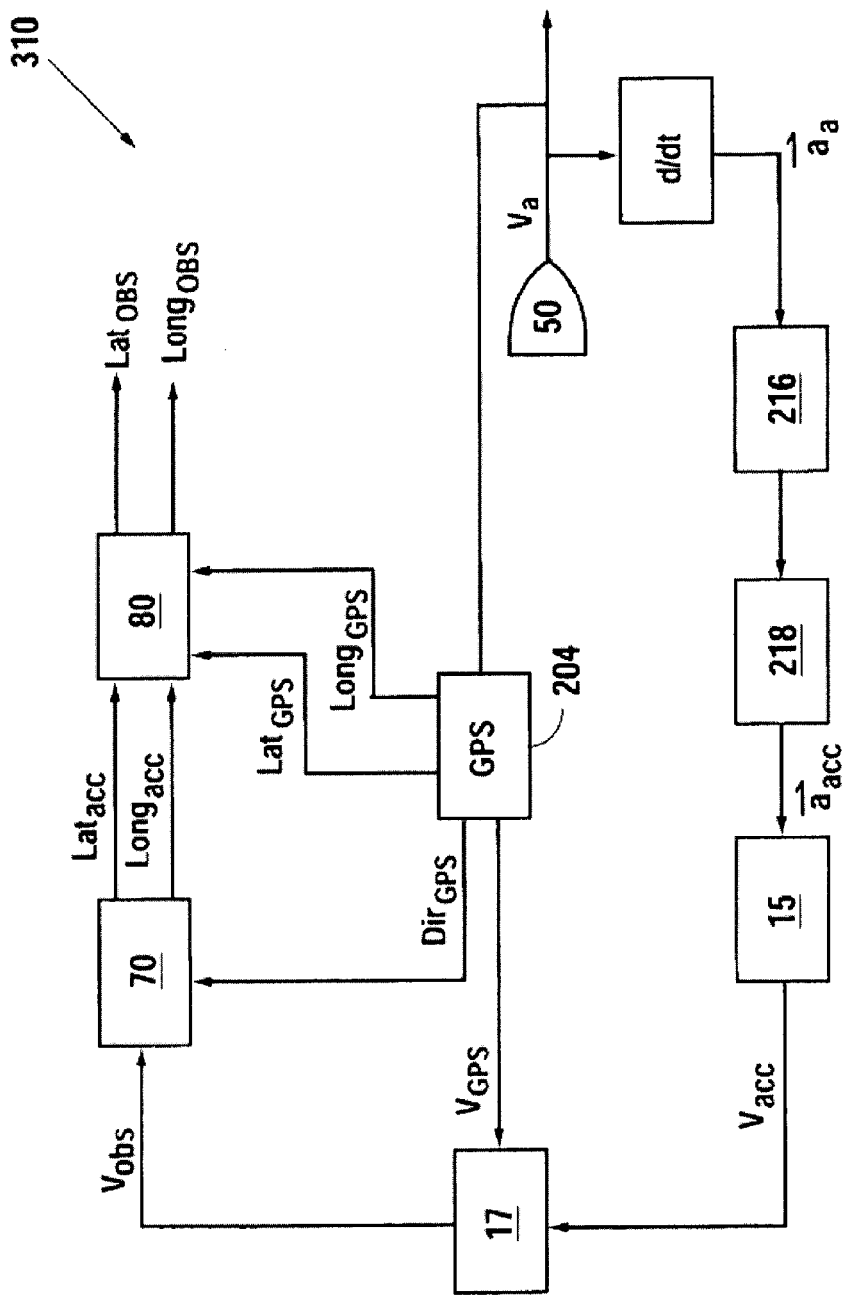
FIG. 3 is a feedback control loop diagram demonstrating the operation of an observer.

As diagrammed in FIG. 3 showing feedback system 310, the inertia measurement device (accelerometer) 216 measures the actual acceleration $a_a$ of a watercraft 50 and the GPS device 204 measures the actual velocity $v_a$ and position of the same watercraft 50. The output from the accelerometer $a_{Acc}$ is input into a first step 15 that coverts $a_{Acc}$ to velocity $v_{Acc}$. The output from first step 15 $v_{Acc}$ and the GPS output $v_{GPS}$ are input to a second step 17. The output from a second step 17 $v_{OBS}$ and the output ($Dir_{GPS}$) indicating course or direction of travel from the GPS device 204 are input into a third step 70 to derive inertial-based estimates of the latitude ($Lat_{Acc}$) and longitude ($Long_{Acc}$) of the watercraft 50. Direct GPS measurements of latitude ($Lat_{GPS}$) and longitude ($Long_{GPS}$) and the outputs from the third step 70 are input in a fourth step 80 to correct inertial-based estimates of the latitude ($Lat_{Acc}$) and longitude ($Long_{Acc}$) of the watercraft 50 to account for any inaccuracies due to drift or acceleration sensor inaccuracies. $Lat_{OBS}$ and $Long_{OBS}$ can then be used to allow the boat driver to record via a user interface the absolute latitude and longitude position coordinates of a course to be saved into a permanent non-volatile memory. Coordinates can be recorded either by direct numerical entry of measured coordinates, or by snapshotting course coordinates as the boat is maneuvering through the course to be mapped. The driver can identify course reference points via a user interface (not shown) or button press as the boat passes the point to be mapped. Since all courses of interest are laid out in straight lines, mapping of two known points in a course is sufficient to fully define the locations of all points of interest in a course and it's direction relative to earth latitude and longitude coordinates. All future passages of the towboat within a specified distance of selected course coordinates as measured by $Lat_{OBS}$ and $Long_{OBS}$ can then be detected and used to initiate timing measurements of the towboat through the mapped course.

Figure 9:
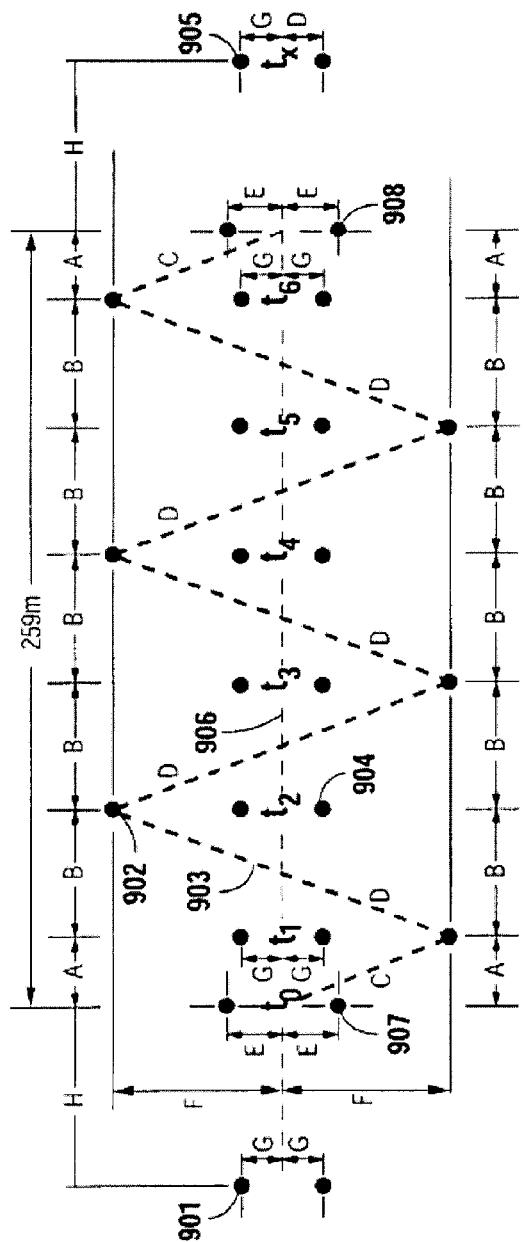
FIG. 9 is an example of a competitive slalom ski course.

FIG. 9 discloses a competitive slalom ski course. This is the type of course on which an embodiment of the present invention may be used. There is shown an entry gate 901, which can be characterized by a precise global coordinate specified in latitude and longitude. The opposite end point of the course is exit gate 905, which may also be characterized as a latitude and longitude. Because the course lies along a substantially straight line, the locations of all points of interest along the course can be found given the positions of the two end points. A course centerline 906 lies along a substantially straight line. The centerline is defined by boat buoys 904, which the water craft must stay in between. There are also provided ski buoys 902, which the skier must ski around during the passage of the course, in an alternating pattern as shown by the ski path 903. The skier must pass between the buoys defining first break point 907 before proceeding along ski path 903. At the end of the course is a second break point 908. The skier must ski between the two buoys defining second break point 908 after passing around the last buoy 902. In between these points are six intermediate points 904, each defined by a pair of buoys, which are positioned to be substantially collinear with the ski buoys 902.

The entry gate 901, exit gate 905, break points 907 and 908 and intermediate buoys 904 are all points of interest whose passage may need to be detected. The time at which the boat 50 passes these points may be used to determine whether a run is valid, according to whether the time is within an allowable margin of error. Because these points are defined according to precisely-surveyed distances, their locations can be detected by a substantially accurate observer (such as is provided by the preferred embodiment of the present invention) given only the location of the two end points. So the mapping course-mapping method described in FIG. 8 provides the observer with sufficient information to determine when a point of interest has been passed in accordance with the method of FIG. 7. Furthermore, the instructions included in the memory may includes instructions that allow the microprocessor to detect any of these and other features or points of interest on the water course from images sent to the microprocessor from the camera(s). In an embodiment, features may be provided on the water course in different colors (e.g., entry and exit gates may be provided in different colors, boat buoys and ski buoys may be provided in different colors, break points and intermediate points may be provided in different colors, etc.) in order to assist in the detections and distinguishing of similar looking but different features/points of interest on the water course from images provided by the camera(s).

Once a course has been mapped, the location of the course can be stored in a permanent storage medium 202 such as a disk drive or flash memory. Further qualification of valid entry to a course can then be carried out based on GPS direction measurements and/or information provided by the vision tracking system so that timing measurements are only made when the towboat enters a mapped course while traveling along the known direction of the course centerline. Further, any deviations of the tow boat from the center line of the course can be detected and factored geometrically into the measurement of displacement down the centerline of the course so that errors in timing measurement due to driver steering error can be compensated for. For example, information provided from the vision tracking system on the watercraft (e.g., images from cameras 11a, 11b, 11c, 11d, 11e, and/or 107) may be used to detect deviations of the water craft from a centerline or other preferred path through the water course. The memory may include instructions that, when executed by the microprocessor, cause the microprocessor to detect features and/or points of interest on the water course from images sent from the cameras (such as, for example, entry gates, exit gates, boat buoys, ski buoys, break points, intermediate points, and a variety of other water course features known in the art) and, in an embodiment, determine a centerline or other preferred path through the water course from those features. The system is further operable to determine a deviation of the watercraft from that centerline or other preferred path. Furthermore, the deviation of the watercraft from that centerline or other preferred path may be used by the system to correct the course of the watercraft in order to keep the water craft along the centerline or other preferred path.

Figure 4:
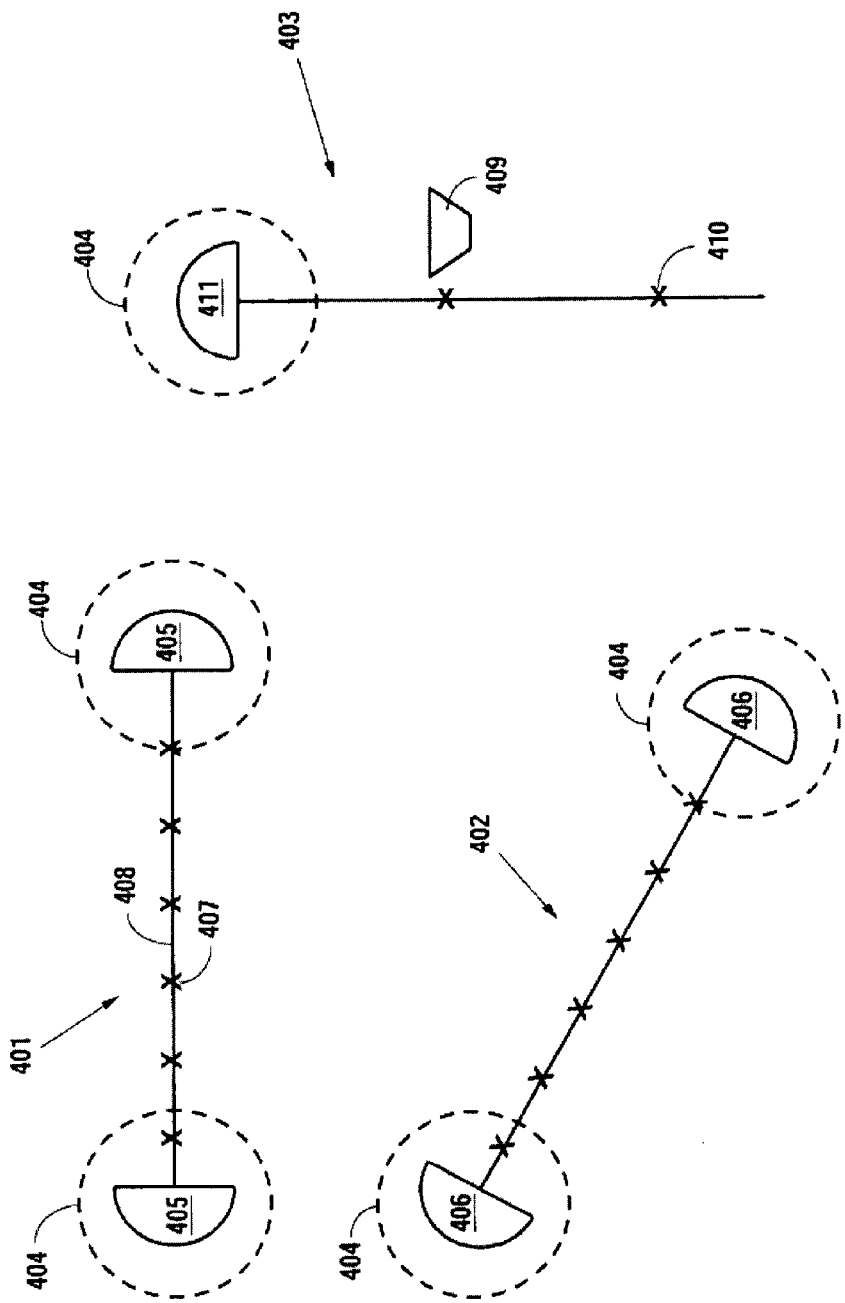
FIG. 4 is a diagram of an example water body including three ski courses.

FIG. 4 discloses a water course with a plurality of competitive ski courses. There is disclosed a first slalom course 401, a second slalom course 402 and a jump course 403. First slalom course 401 has entry and exit thresholds 405. Second slalom course 402 has entry and exit thresholds 406. The slalom courses may be traversed in either direction through entry and exit thresholds 405 and 406. A jump course 403 may be entered only through entry threshold 411 because ski jump 409 is unidirectional.

According to a preferred embodiment of the present invention, a user may approach a course, for example first slalom course 401. Upon entering the entry threshold 405 in the direction of the course centerline 408, the user will press a button whereby the computing device is alerted of the location of the entry/exit threshold. The user then proceeds along course centerline 408 and presses a button again at the opposite entry/exit threshold 405.

The computing device also interfaces with a permanent storage medium. This storage medium contains the desired locations of intermediate buoys 407, which are located at predetermined distances from the entry/exit buoys. Furthermore, information provided from the vision tracking system on the watercraft (e.g., images from cameras 11a, 11b, 11c, 11d, 11e, and/or 107) may be used to detect or confirm the positions of the entry/exit threshold and the intermediate buoys, e.g., by the computing device analyzing the images, determining if the entry/exit threshold or intermediate buoy is being passed by the watercraft, and confirming the location of the entry/exit threshold or intermediate buoy stored in the storage medium with the location of the entry/exit threshold or intermediate buoy in the image. "This process" allows the computing device to learn the exact location of first slalom course 401. "The process" can then be repeated to allow the computing device to learn the locations of second slalom course 402 and jump course 409.

Once the computing device has learned the locations of courses 401, 402 and 403, it is desirable for the device to automatically detect which course it is at without further user intervention. So there are shown mapped lockout regions 404 around each of the entry/exit thresholds 405, 406 and 411. According to the method disclosed in FIG. 6, the device will detect which of the mapped courses is closest to its present position. The device may also selectively detect only courses of a specific type (jump or slalom) depending on its current mode of operation. If the device then determines it is within a lockout regions 404, it will check to see if the boat is approaching from outside the entry/exit threshold and in the correct direction along the course centerline. If these criteria are met, then the device will calculate the time of the closest approach to the plane of the entry gate. At that time it will begin timing the path without any intervention from the user.

Because the locations of intermediate buoys 407 may be pre-programmed and/or detected from information received from the vision tracking system, the system may provide an audible or visual indication of the passing of each intermediate buoy 407. It may also provide intermediate times at the passing of each intermediate buoy 407. Finally, it will calculate the time at which boat 50 passes through the opposite entry/exit threshold 405.

In this manner the device can automatically time a pass through a water course without any further intervention from the user.

A driver score can also be provided based on the degree of this error which can be used to rate driver performance and confirm accuracy of the boat path through the water course, which is also a criterion used in judging whether a competitive pass is valid.

Any boat speed or engine torque modification requirements which may depend on position in the course can be triggered based on $\text{Lat}_{OBS}$ and $\text{Long}_{OBS}$ relative to the mapped course location and/or from information received from the vision tracking system.

As one skilled in the art will recognize, an embodiment of the system of the present disclosure includes commonly understood instruments that measure an object's acceleration. The velocity of on object can be calculated by integrating the acceleration of an object over time. Further, the position of an object relative to a known starting point can be calculated by integrating the velocity of an object over time. A GPS device is one of the category of commonly understood instruments that use satellites to determine the substantially precise global position and velocity of an object. Such position and velocity measurements can be used in conjunction with timers to determine an object's instantaneous velocity and average velocity between two points, along with its absolute position at any point in time. A comparator is any analog or digital electrical, electronic, mechanical, hydraulic, or fluidic device capable of determining the sum of or difference between two input parameters, or the value of an input relative to a predetermined standard. An algorithm is any analog or digital electrical, electronic, mechanical, hydraulic, or fluidic device capable of performing a computational process. The algorithms disclosed herein can be performed on any number of computing devices commonly called microprocessors or microcontrollers, examples of which include the Motorola® MPC555 and the Texas Instruments® TMS320.

Use of observed velocity and position estimates based on inertial or other measurement sources allows for error correction of occasional glitches or interruptions in availability of accurate GPS velocity and position measurements. These can occur in the course of normal operations, either due to GPS antenna malfunction, or temporary loss of GPS satellite visibility due to overhead obstruction from bridges or overhanging vegetation and the like.

Other embodiments of the system could include automated steering of the boat down the centerline of the water course by, for example, making use of course location information stored as described above, and/or using the information provided by the vision tracking system as discussed above. The present disclosure may be included as part of an electronic closed-loop feedback system that controls the actual angular velocity $\omega a$ of a boat propeller, and, indirectly, the actual over land velocity $V_a$ of the watercraft propelled by that propeller.

Another embodiment allows the system to track the position of a skier behind the watercraft as he/she traverses the course. This can be achieved by mounting a GPS antenna somewhere on or near the body of the skier and capturing these data concurrently with data from a tow boat mounted antenna. Such GPS antennae can be either wired or wirelessly connected to the main apparatus. This can also be achieved by using information from the vision tracking system (e.g., using images of the skier and provided by the camera(s) and detecting the skier and possibly features/points of interest on the water course in the image.)

It will be apparent to those with ordinary skill in the relevant art having the benefit of this disclosure that the present disclosure provides a system for tracking the position and velocity of a watercraft through a prescribed course without the need for measurement aids such as magnets built into the course infrastructure. It is understood that the forms of the present disclosure shown and described in the detailed description and the drawings are to be taken merely as presently preferred examples and that the invention is limited only by the language of the claims. The drawings and detailed description presented herein are not intended to limit the present disclosure to the particular embodiments disclosed.

While the present disclosure has been described in terms of one preferred embodiment and a few variations thereof, it will be apparent to those skilled in the art that form and detail modifications can be made to that embodiment without departing from the spirit or scope of the present disclosure.

We claim:

1. A system for detecting a position of a watercraft, the system comprising:
   a position observer subsystem including a position determination device and a camera;
   a computing device in communication with the position observer subsystem; and
   non-volatile storage coupled to the computing device and configured to be programmed with locational information describing at least one water course;
   wherein the computing device is configured to receive a position from the position determination device and an image from the camera as the position determination device and the camera moves through the at least one watercourse, determine that the position received from the position determination device is adjacent a first water course feature on the at least one water course described by the locational information, detect the first water course feature in the image, and use the first water course feature detected in the image to confirm the position of the watercraft adjacent to the first water course feature.

2. The system of claim 1, further comprising:
   a user interface allowing driver inputs to permanently store and identify a plurality of water course features on the at least one water course.

3. The system of claim 1, wherein said user interface further comprises:
   a progress indicator configured to substantially represent the position of the watercraft relative to the at least one water course.

4. The system of claim 2, wherein the computing device is configured to detect a pair of water course features in the image and the user interface is further configured to provide an audible signal when the watercraft crosses a line between the two water course features.

5. The system of claim 2, wherein the user interface is further configured to provide an audible signal when a watercraft is adjacent to and within a predetermined distance of the first water course feature.

6. A watercraft position determination system, comprising:
   a position determination device;
   a camera;
   a storage including locational information about a watercourse;
   a clock; and
   a computing device coupled to the position determination device, the camera, the storage, and the clock, wherein the computing device is configured to use a plurality of different positions received from the position determination device and a plurality of images received from the camera as the position determination device and the camera moves through the watercourse, determine that each of the plurality of different positions received from the position determination device are adjacent a respective water course feature included in the locational information about the watercourse at a plurality of different times received from the clock, and analyze the plurality of images to detect the respective water course feature in each of the plurality of images to confirm each different position of the watercraft adjacent each respective water course feature, and wherein the computing device is configured to compare the confirmed different positions of the watercraft adjacent each respective water course feature at the plurality of different times to determine a displacement of the watercraft on the water course.

7. The system of claim 1, wherein the computing device is configured to receive a plurality of images from the camera, detect the first water course feature in a first image and a second water course feature in a second image, and determine a time between the first water course feature and the second water course feature.

8. The system of claim 1, wherein the computing device is configured to determine that the first water course feature is an entry point for the at least one water course.

9. The system of claim 1, further comprising:
a display configured to display the time.

10. The system of claim 7, wherein the computing device is configured to determine an error time that is a difference between an ideal time and the time determined between the first water course feature and the second water course feature.

11. A system for measuring a position of a watercraft relative to a water course, comprising:
a position determination device coupled to a watercraft and configured to provide a plurality of different positions as the watercraft moves through the watercourse;
a camera coupled to the watercraft and configured to provide a plurality of images as the watercraft moves through a water course;
a permanent storage medium configured to include locational information for the water course;
a computing device coupled to the position determination device, the camera, and the permanent storage medium and configured to receive the plurality of different positions and the plurality of images as the watercraft moves through the water course, determine that the plurality of different positions are each adjacent a respective water course feature included in the locational information for the water course as the watercraft moves through the water course, analyze the images to detect the respective water course feature in each of the plurality of images for each of the plurality of different positions that are determined as the watercraft moves through the water course, and use the respective water course feature detected in each of the plurality of images to confirm each position of the watercraft adjacent each respective water course feature as the watercraft moves through the water course.

12. The system of claim 11, wherein the position determination device is a GPS device configured to provide GPS information to the computing device.

13. The system of claim 12, wherein the computing device is configured to compare the GPS information with the locational information to determine each of the plurality of different positions are adjacent the respective water course feature.

14. The system of claim 12, wherein the GPS information includes a GPS latitude value and a GPS longitude value.

15. The system of claim 6, wherein the position determination device is a GPS unit coupled to the computing device, and wherein the computing device is configured to compare GPS information from the GPS unit with the locational information to determine that each of the plurality of different positions are adjacent the respective water course feature.

16. The system of claim 11, wherein the computing device is configured to detect a first water course feature in a first image and a second water course feature in a second image, and determine a time between the first water course feature and the second water course feature.

17. The system of claim 11, wherein the computing device is configured to determine that a first water course feature is an entry point for the at least one water course.

18. The system of claim 15, further comprising:
an auditory device coupled to the computing device, wherein the auditory device is configured to create an audible noise when each of the plurality of different positions of the watercraft is confirmed adjacent each respective water course feature.

* * * * *